H. HYDE.
APPARATUS FOR BURNING HYDROCARBON.
APPLICATION FILED AUG. 2, 1906.
902,298.
Patented Oct. 27, 1908.
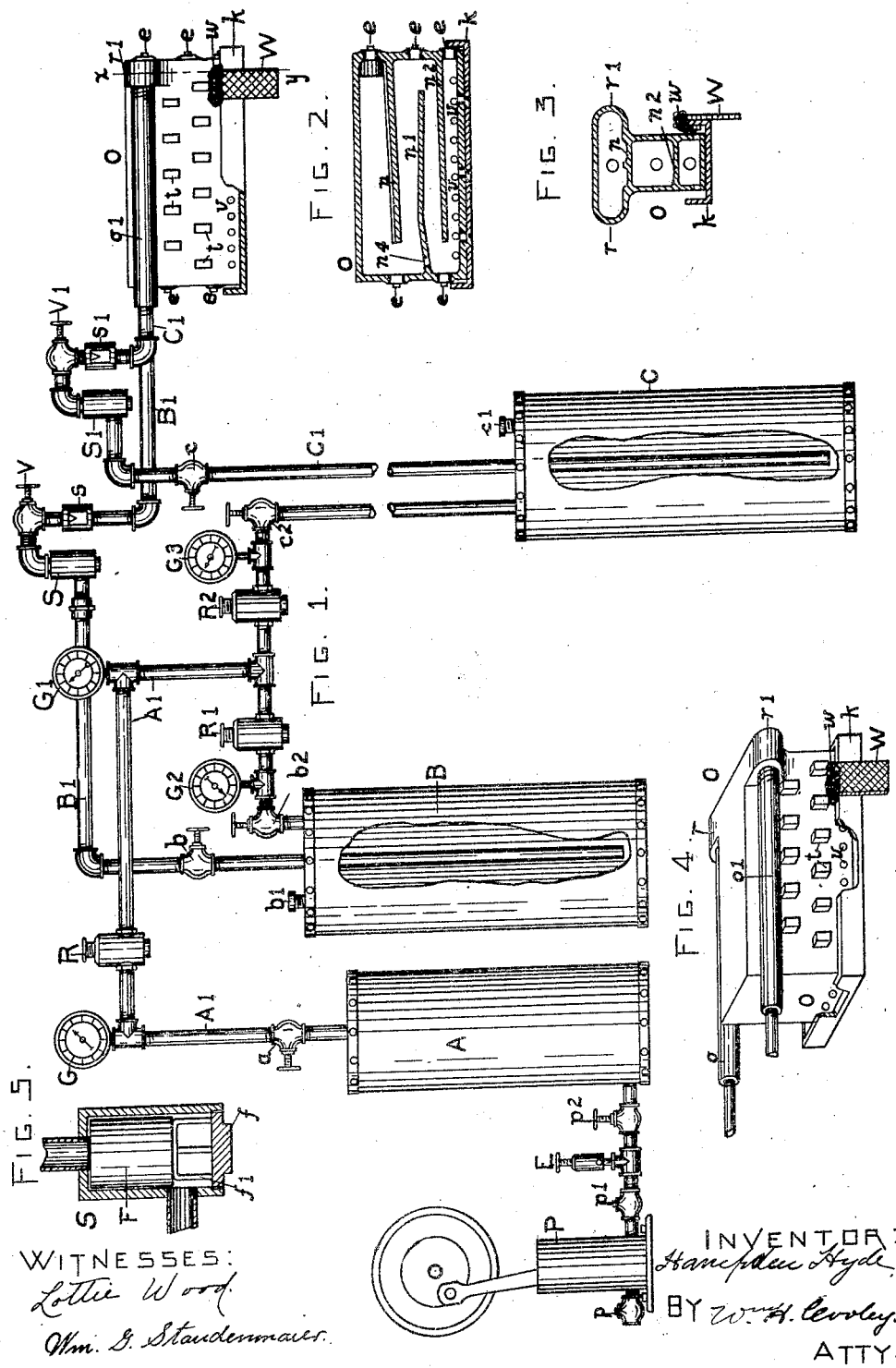

UNITED STATES PATENT OFFICE.

HAMPDEN HYDE, OF ROCHESTER, NEW YORK.

APPARATUS FOR BURNING HYDROCARBON.

No. 902,295.

Specification of Letters Patent.

Patented Oct. 27, 1908.

Application filed August 2, 1906. Serial No. 328,866.

*To all whom it may concern:*

Be it known that I, HAMPDEN HYDE, a citizen of the United States, residing at Rochester, in the county of Monroe and State of New York, have invented a new and Improved Apparatus for Burning Hydrocarbon, such as Fuel-Oil, of which the following is a specification.

This invention relates to an apparatus for burning cheap oil such as fuel oil and more especially to an apparatus for gasifying such oil and intimately mixing it with steam at high temperature in a suitable mixing and generating chamber for the purpose of securing a more complete and economical consumption of such oil. In such systems I have found the following features very desirable and important.

First, it is necessary that the molecules of steam and gasified oil shall be thoroughly intermingled and maintained at a high temperature in a mixing and generating chamber, from which such combined gases shall be caused to issue through fine orifices and under sufficient pressure to maintain a practically constant supply therethrough, and it is also important that the walls of this chamber be formed with as few joints as consistent and exposed continuously to the action of the heat resulting from the combustion of such gases. It is desirable also that the steam and gasified oil be caused to traverse some little distance in contact with highly heated walls or surfaces of the generating chamber and that such gases be caused to traverse some distance in changing directions, preferably to and fro, in contact with the heated walls of the generating chamber. I have devised a mixing and generating chamber composed preferably of a single casting of iron and having partitions therein so arranged as to cause the gases in passing through the chamber to be thoroughly mixed and kept in contact with the highly heated walls of the chamber and the partitions therein.

Second, it is often important, for considerations of safety, that the tank or reservoir containing the oil be supported at a distance considerably below the level of the mixing and generating chamber and on account of this consideration it is important that the feed from the oil tank should be maintained by other means than gravity, such for instance, as air pressure, and it is also very important that such pressure be regulable independently of the pressure in or the height of the water tank. It is obvious that the pressure upon the oil tank should be varied according to the difference in heights of the oil reservoir and the mixing and generating chamber or points of combustion.

Third, the supply of water to the mixing and generating chamber should be maintained uniform and this may best be done by means of a regulable air pressure upon the water in the water tank and this pressure should be regulable independently of the pressure upon the oil tank.

Fourth, it is desirable that the pressure upon the oil in the oil tank and the water in the water tank, each regulable independently of the other, should be maintained from a common source of air or gas under pressure, in order that the regulation between the pressures on the oil and water tanks may be more perfectly maintained. For this reason it is also desirable that there be maintained a supply of air or gas under a practically constant pressure in a suitable storage reservoir by means of a pump, operated by any suitable prime mover, and obviously, for purposes of economy, it is preferable that the pressure in the air storage reservoir be several times greater than that in the oil and water tanks and that such pressure be reduced in and through a common channel to such water and oil reservoir and made regulable in each independently of the other through a suitable regulating and reducing apparatus.

Fifth, it is also important that there be provided suitable needle valves and sight feeds for regulating the flow of the water and of the oil to the mixing and generating chamber and that between each of such reservoirs and its corresponding needle valve there be interposed a suitable straining apparatus to remove, as far as possible, from the oil and water any particles tending to clog such needle valves and render their action uncertain.

As an important aid in regulating the flow of the oil and water through the adjustable needle valves, I have found it desirable to make use of means for independently regulating the pressure upon the water and oil tanks each independently of the other as a much more satisfactory regulation can be effected in this way and there is far less occasion for fine adjustments of the needle valves which otherwise would require frequent and very careful adjustment. This independent regulation of the pressure upon the water and oil, while advantageous in any apparatus for the consumption of fuel oil, I have found a matter of great importance with the style of mixing and generating chamber and burner which I have devised for the more efficient consumption of such oil, in that, such independent pressure regulation by maintaining a uniform supply of oil and water to the generator prevents surging of the flame, which sometimes results when such independent adjustable regulating means is not made use of.

With these objects in view, my invention consists in the apparatus shown in the accompanying drawings, in which Figure 1 shows the complete apparatus in elevation. Fig. 2 is a vertical central section of the mixing and generating chamber. Fig. 3 is a vertical transverse section of the mixing and generating chamber taken along the line $x$—$y$ of Fig. 1 and as seen from the left. Fig. 4 shows the mixing and generating chamber in perspective. Fig. 5 is a vertical central sectional view of one of the strainers.

Referring to the drawings,—P is the air pump which may be, preferably constantly, driven by any prime mover. Air is taken into the pump through the check valve $p$, as seen at the left and is forced outwardly through the check valve $p^1$ at the right, and thence through the adjustable pressure relief valve E, by means of which relief valve the pressure may be maintained practically constant in the air reservoir A, into which the air passes from the relief valve E through a cut-off valve $p^2$ of usual construction.

From the air reservoir A a pipe $A^1$ extends upwardly and to the right and then downwardly, as indicated in the drawings. In this pipe $A^1$ and approximately close to the reservoir A is seen a cut-off valve $a$, of usual construction, and above that is seen a T, the upper end of which is connected through the usual reducer with a pressure gage G. In the horizontal portion of the pipe $A^1$ and just to the right of the pressure gage G is seen a pressure reducing valve R and between the horizontal member of the pipe $A^1$ and the right hand vertical member thereof there is seen a T, to which, through the usual reducer, a connection is made with the gage $G^1$. The gage $G^1$, it will be noticed, indicates a lower pressure than the gage G, the difference between the pressures indicated by these two gages being effected by means of the pressure reducing valve R. The right hand vertical member of the pipe $A^1$ extends downwardly into a T, from which a pipe leads to the left through the pressure reducing valve $R^1$ and from thence to a T, to which is connected the pressure gage $G^2$, and from thence connection is made through the cut-off valve $b^2$, of usual construction, and a pipe leading therefrom, into the water tank B, very nearly to the bottom of which on the inside there extends vertically a pipe $B^1$ having connected up therein first the cut-off valve $b$, of usual construction, next the strainer S and then the needle valve V and connecting therewith the sight feed $s$ and thence the pipe $B^1$ leads to the connection $o$ of the mixing chamber O. At the lower end of the right hand vertical member of the pipe $A^1$ and on the right hand side thereof is seen a short section of pipe leading to the pressure reducing valve $R^2$ and from thence connection is made through a T, having connected thereto a pressure gage $G^3$, to the oil reservoir C through a suitable pipe, in which is located a cut-off valve $c^2$ of usual construction.

From near the bottom on the inside of this oil reservoir C there extends upwardly a pipe $C^1$ having the cut-off valve $c$ therein, of usual construction, and from thence such pipe $C^1$ is connected through a strainer $S^1$ with the needle valve $V^1$ and sight feed $s^1$, the pipe $C^1$ thence extending to the connection $o^1$ of the mixing and generating chamber O. The water tank B has a screw plug $b^1$ at its upper end which may be removed for the purpose of filling the reservoir B and in the same way and for the same purpose the oil reservoir C has at its upper end a removable screw plug $c^1$.

The mixing and generating chamber O comprises preferably a single box-like casting, as shown in Figs. 1, 2, 3 and 4, having at its right hand end the hollow ears or lugs $r$ and $r^1$, which have threaded openings therein to receive the connecting members $o$ and $o^1$ respectively. These hollow lugs $r$ and $r^1$ connect with the interior of the mixing and generating chamber O, and nearly horizontally disposed therein are seen the partitions $n$, $n^1$ and $n^2$. The partition $n$ extends downwardly to the left and the partition $n^1$ throughout its main portion slants slightly downwardly to the right and the partition $n^2$ slants downwardly to the left. These partitions $n$, $n^1$ and $n^2$ are preferably cast integrally with the box-like shell O and, for the purpose of fully removing the cores, openings are provided which are threaded to receive the removable screw plugs $e$—$e$. Near the left hand end of the partition $n^1$ is seen a depression forming a pocket, and through the bottom thereof there is obliquely bored a hole $n^4$, as indicated in Fig. 2 of the drawings, such hole being bored by inserting a drill through the opening adapted to receive the uppermost plug $e$, seen to the left in Fig. 2. Around the lower edge of the chamber O and just within the bottom thereof are bored holes for the escape of the combustible gas formed by the intimate mixture of the superheated steam and gasified oil in this chamber O. These holes $v$ are bored so that they enter the chamber O just above the bottom wall. On the under side of the chamber O there is secured, by means of screws as indicated in Fig. 2, a pan $k$ having its edges projecting considerably above the openings $v$ for the escape of the gas from the chamber O. The partition $n$ has formed therein, a longitudinal ridge for preventing the spreading of the oil over the entire surface of the partition or shelf $n$ during the process of priming or starting the fire. The side walls of the chamber $o$ are provided with heat-absorbing projections $t$ extending outwardly into the path of the flame in order to absorb more of the heat from such flame and impart the same to the side walls of the generating chamber.

It sometimes happens that my burner is used in places not affording ready access to the pan $k$ for lighting the oil therein by means of a match. In such cases I prefer to make use of an asbestos wick W, which may extend to some suitably accessible point and which, by capillary action, will become moistened with the oil from the pan $k$ and then when ignited, the flame travels along such wick and encountering the loose and fluffy material, preferably the same as the wick is composed of, as seen at $w$, spreads thereover and by this means the oil in the pan $k$ is readily ignited.

Referring to Fig. 5, which shows one of the strainers S in vertical section,—the strainer comprises a cylinder S into the open and lower end of which is threaded the bottom piece $f$ carrying cross wires $f^1$ adapted to support a roll of felt or suitable material F, which is formed up into a roll loosely fitting in the shell S, above the feed pipe opening in the side wall thereof. I have found this style of strainer operates very successfully and the construction thereof is such as to afford ready access for cleaning, for which purpose the bottom piece $f$ is unscrewed and the felt F removed, cleansed and then inserted or a new felt may be inserted, the whole operation requiring but a very brief period of time. Indeed oftentimes a new felt may be inserted without seriously interrupting the fire.

The pressure reducing valves $R^1$ and $R^2$ coöperate with the needle valves V and $V^1$ respectively to secure the desired relative rates of flow of the oil and water to the mixing and generating chamber O. The adjustment of these valves R and $R^1$ will be modified considerably by the relative heights of the tanks B and C as well as also the relative adjustments of the needle valves V and $V^1$ respectively. It is a well known fact that needle valves used under such circumstances are apt to clog and the proper adjustment of them requires considerable care and frequent attention and this has been found a serious source of difficulty in the successful continuous operation of apparatus of the kind described herein. These difficulties are very largely removed by the use of the pressure reducing valves which, on account of the readiness with which very slight differences in pressure may be provided for, operate to compensate for any reasonable lack of proper adjustment of the needle valves, and in case it is desired at any time during the operation of the apparatus to modify the relative rates of flow of the oil and water, such modification can be effected instantaneously and with any desired degree of accuracy by modifying the adjustment of the reducing valves; indeed I have found that many valves of ordinary construction with carefully finished parts may be used in place of the well known needle valve and the flow regulated quite entirely by the adjustment of the pressure reducing valves $R^1$ and $R^2$. These pressure reducing valves $R^1$ and $R^2$, while very similar to the reducing valve R, they are used for a very materially different purpose. Such valves $R^1$ and $R^2$ sustain each of them a definite relation to the reducing valve R and independently thereof they also sustain definite relations each to the other.

Any solid or semi-solid particles carried over from the water tank B or oil tank C are removed before reaching the needle valves V and $V^1$ respectively and are thus prevented from affecting the adjustment thereof being removed by the strainers S and $S^1$ respectively interposed in the pipes leading to such valves from the tanks B and C.

In using my apparatus,—the valves $a$, $b$ and $c$ are closed, the tank B is filled with water and the tank C is filled with oil, the pump P is operated and the pressure relief valve E adjusted to secure the desired air pressure in the reservoir A. The needle valves V and $V^1$ are adjusted approximately. The valves $a$ and $c$ are then opened. This causes a flow of oil from the oil tank C to and through the mixing and generating chamber O from which it issues through the orifices $v$ in the pan $k$. After the wick W has become saturated therewith, the oil may be ignited at the wick W and the flame extending along the wick and into the fluffy portion thereof $w$ ignites the oil in the pan $k$ and the heat resulting from the burning of the oil in this pan $k$ heats up the generating and mixing chamber O to a high temperature, and after this chamber O has been sufficiently heated the valve $b$ is opened and the water from the tank B is forced into the generating chamber and is therein formed into steam and the oil which is fed to this generating and mixing chamber O is gasified and mixed with the superheated steam in passing through the generating chamber O by coming into contact with the heated walls thereof and partitions therein, such gas is burned as it issues from the orifices v. The needle valves V and V¹ are adjusted to secure approximately the desired conditions at the burner but such needle valves V and V¹ need not, however, be carefully adjusted as a very fine adjustment of the relative flow of oil and water may be effected by means of the reducing valves R¹ and R². Such valves R¹ and R² may be adjusted from time to time to meet any ordinary changes in conditions called for.

It will be noticed that the upper edges of the side walls of the pan $k$ extend somewhat above the orifices $v$. The result of this is that the flame is prevented from extending downwardly within the pan $k$ and between the side walls thereof and the walls of the chamber O and the gases are caused to burn entirely above the upper edges of the side walls of the pan $k$ and entirely around the side walls of the chamber O in a practically uninterrupted sheet of flame.

In starting the fire, the oil from the oil tank C flows down over the partition $n$ on the side thereof towards the observer, in Figs. 1, 2 and 4 the longitudinal ridge through the center thereof preventing the spreading of the oil; from thence it drops onto the partition $n^1$ and into the depression seen at the left hand end thereof and runs through the holes $n^3$ in such pocket or depression and falls onto the bottom of the chamber O and runs out through the holes $v$ therein without having to pass over the partitions $n^1$ and $n^2$. This hole $n^4$ is, however, of such a size as not to interfere with the normal passage of the gases to and fro over and between the partitions $n$, $n^1$ and $n^2$ in reaching the orifices $v$, its size being such that its action upon the gases is negligible.

What I claim is:—

1. In an apparatus of the character described, a mixing and generating chamber comprising a hollow casting having transversely arranged partitions therein adapted to cause a to and fro movement of the gases or fluids passing therethrough; feed pipes for oil and water connecting with such chamber at approximately the same level and near the top of the chamber; a receptacle for a sub-flame and openings through one of such partitions permitting oil to reach such receptacle without passing the entire length of such partitions.

2. In an apparatus of the character described, a mixing and generating chamber, a water tank connected to such generating chamber by a pipe containing a suitable regulating valve, an oil tank connected to such chamber through a pipe containing a suitable regulating valve and means for maintaining a regulable pressure of air or gas in such water tank and independent thereof means for maintaining a regulable pressure of air or gas in such oil tank.

3. An apparatus for burning hydro-carbon comprising an oil tank, a water tank, a mixing and generating chamber and means for subjecting the same continuously to the action of the heat resulting from the combustion of such hydro-carbon, a pipe leading from such oil tank to such mixing and generating chamber containing a valve and a strainer interposed between the tank and the valve, a pipe leading from such water tank to such generating chamber containing a valve and a strainer between the tank and the valve, a source of air or gas under pressure, means for supplying air or gas under pressure to such oil tank and for regulating the pressure of the air therein and independent means for supplying air or gas under pressure to such water tank and for regulating the pressure therein.

4. An apparatus for burning hydro-carbon comprising an oil reservoir, a water reservoir, a mixing and a generating chamber independently connected to each of such tanks through separate pipes having regulating valves therein, means for supplying air or gas under pressure to such water tank and for regulating such pressure and independent means for supplying air or gas under pressure to such oil tank and for regulating the pressure therein.

5. In an apparatus of the character described, a mixing and generating chamber comprising a metallic box; a sub-flame pan secured to the under side of such box; exit orifices through the side walls of such chamber near the lower edge thereof, the edges of such pan extending upwardly above and in proximity to such orifices and adapted to prevent ignition of the gases issuing therefrom below the edges of such pan whereby such gases may be caused to burn in a solid sheet of flame surrounding such chamber and extending upwardly from the upper edges of the side walls of such pan and projecting members of heat conducting material extending outwardly from the side walls of such chamber and into the path of the flame.

HAMPDEN HYDE.

Witnesses:
WM. G. STANDENMAIER,
LOTTIE WOOD.